United States Patent
Azuma et al.

(10) Patent No.: US 10,629,856 B2
(45) Date of Patent: Apr. 21, 2020

(54) ELECTRODE ASSEMBLY AND NONAQUEOUS ELECTROLYTE SECONDARY BATTERY

(71) Applicant: Sumitomo Chemical Company, Limited, Tokyo (JP)

(72) Inventors: Yuichiro Azuma, Niihama (JP); Takamasa Egawa, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 287 days.

(21) Appl. No.: 15/819,448

(22) Filed: Nov. 21, 2017

(65) Prior Publication Data
US 2019/0081284 A1    Mar. 14, 2019

(30) Foreign Application Priority Data
Sep. 14, 2017  (JP) .................. 2017-177054

(51) Int. Cl.
| | |
|---|---|
| H01M 2/02 | (2006.01) |
| H01M 10/0525 | (2010.01) |
| H01M 2/10 | (2006.01) |
| H01M 10/02 | (2006.01) |
| H01M 10/052 | (2010.01) |
| H01M 10/48 | (2006.01) |

(52) U.S. Cl.
CPC ....... *H01M 2/0202* (2013.01); *H01M 2/0275* (2013.01); *H01M 2/1022* (2013.01); *H01M 10/02* (2013.01); *H01M 10/0525* (2013.01); *H01M 2/0272* (2013.01); *H01M 10/052* (2013.01); *H01M 10/48* (2013.01); *H01M 2002/0297* (2013.01); *H01M 2200/00* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 6,524,750 B1 * | 2/2003 | Mansuetto | C01G 23/043 429/206 |
| 2001/0001053 A1 * | 5/2001 | Hanson | H01M 4/04 429/233 |

FOREIGN PATENT DOCUMENTS

| | | |
|---|---|---|
| JP | 2010287466 A | 12/2010 |
| JP | 2015210980 A | 11/2015 |

* cited by examiner

*Primary Examiner* — Christopher P Domone
(74) *Attorney, Agent, or Firm* — Panitch Schwarze Belisario & Nadel LLP (57) ABSTRACT

The present invention makes it possible to improve a nonaqueous electrolyte secondary battery in quality. An adhesive tape, an insulator, and an insulating tape each have a color value in the Munsell color system of not less than 3.0 and not more than 9.2 and a chroma in the Munsell color system of not less than 0.5.

5 Claims, 5 Drawing Sheets

ELECTRODE ASSEMBLY AND NONAQUEOUS ELECTROLYTE SECONDARY BATTERY

This Nonprovisional application claims priority under 35 U.S.C. § 119(a) on Patent Applications No. 2017-177054 filed in Japan on Sep. 14, 2017, the entire contents of which are hereby incorporated by reference.

TECHNICAL FIELD

The present invention relates to (i) an electrode assembly for use in a nonaqueous electrolyte secondary battery and (ii) a nonaqueous electrolyte secondary battery.

BACKGROUND ART

A nonaqueous electrolyte secondary battery such as a lithium-ion secondary battery is in widespread use as a battery for devices such as a personal computer, a mobile phone, and a mobile information terminal. Attention is paid to, in particular, the lithium-ion secondary battery because the lithium-ion secondary battery emits less carbon dioxide and makes a greater contribution to energy saving than a conventional secondary battery.

An electrode assembly for use in a nonaqueous electrolyte secondary battery includes: an electrode group including a positive electrode member which serves as a positive electrode, a negative electrode member which serves as a negative electrode, and a separator provided between the positive electrode member and the negative electrode member; and various components which are provided in the vicinity of the electrode group. Examples of such a component include adhesive tape (see Patent Literature 1) and an insulating protective layer which has a portion bonded to an outer peripheral surface of an electrode group (see Patent Literature 2).

CITATION LIST

Patent Literature

[Patent Literature 1]
Japanese Patent Application Publication Tokukai No. 2015-210980 (Publication date: Nov. 24, 2015)
[Patent Literature 2]
Japanese Patent Application Publication Tokukai No. 2010-287466 (Publication date: Dec. 24, 2010)

SUMMARY OF INVENTION

Technical Problem

The above-described various components are at risk of foreign matter adhesion. Examples of the foreign matter include black electrically-conductive substances (such as acetylene black and graphite) and white substances (such as dust and separator fragments). Note here that the separator fragments mean, for example, fragments of a porous polyolefin film or inorganic filler came off from a functional layer provided on the porous polyolefin film.

In a case where an electrode assembly including such a component with foreign matter adhering thereto is used to prepare a nonaqueous electrolyte secondary battery, the following issue may occur.

Specifically, in a case where an electrode assembly including a component with foreign matter adhering thereto is placed in a housing such as a battery can, the foreign matter may adhere to an inner wall of the housing. After that, when the housing is sealed with a closure, the foreign matter may be trapped between the housing and the closure, causing a decrease in sealing performance of the housing. This increases the likelihood of an electrolyte solution leaking out of the nonaqueous electrolyte secondary battery, and in turn causes a decrease in quality of the nonaqueous electrolyte secondary battery.

An object of the present invention is to provide (i) an electrode assembly which allows for an improvement in quality of a nonaqueous electrolyte secondary battery and (ii) a nonaqueous electrolyte secondary battery with improved quality.

Solution to Problem

In order to attain the above object, an electrode assembly in accordance with an aspect of the present invention is an electrode assembly configured to be housed in a housing, the electrode assembly including: an electrode group including a positive electrode member, a negative electrode member, and a separator provided between the positive electrode member and the negative electrode member; and a component provided on or near the electrode group, the component having a color value in the Munsell color system of not less than 3.0 and not more than 9.2 and a chroma in the Munsell color system of not less than 0.5.

According to the above configuration, the component provided on or near the electrode group of the electrode assembly in accordance with an embodiment of the present invention has such a color that makes a black electrically-conductive substance and a white substance adhering to the component sufficiently visible, and therefore foreign matter adhering to the component is easily found. This makes it possible to find and remove foreign matter adhering to the component before placing the electrode assembly in the housing. This in turn allows for an improvement in sealing performance of the housing, prevents an electrolyte solution from leaking out of a nonaqueous electrolyte secondary battery, and therefore allows for an improvement in quality of the nonaqueous electrolyte secondary battery. In addition, because the foreign matter is prevented from entering the nonaqueous electrolyte secondary battery, the nonaqueous electrolyte secondary battery is further improved in quality.

Advantageous Effects of Invention

An aspect of the present invention allows for an improvement in quality of a nonaqueous electrolyte secondary battery.

DESCRIPTION OF EMBODIMENTS

The following description will discuss embodiments of the present invention with reference to FIG. 1A through FIG. 5B. For convenience, any member having a function identical to that of a previously-described member will be assigned an identical reference number, and a description thereof may be omitted.

Embodiment 1

Figure 1A:
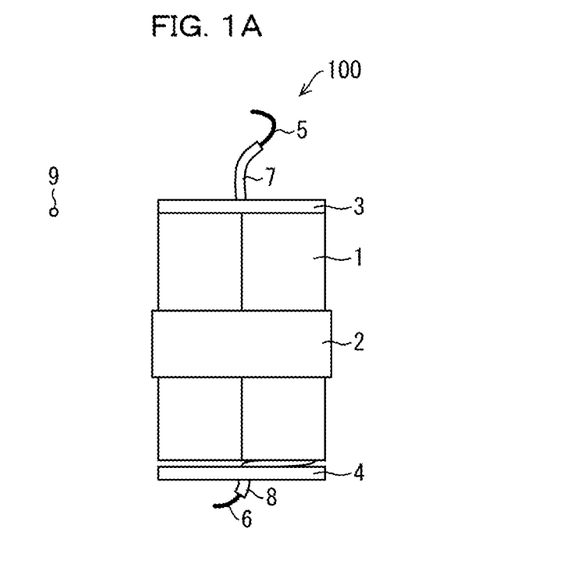
FIG. 1A is a side view schematically illustrating a configuration of an electrode assembly in accordance with Embodiment 1 of the present invention.
Figures 1B, 1C:
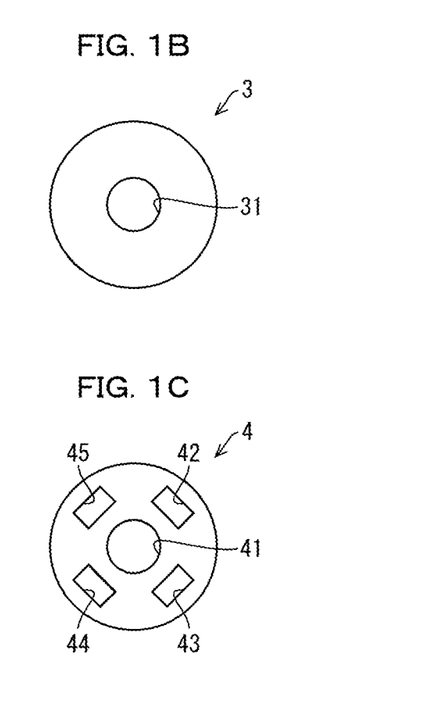
FIG. 1B and FIG. 1C are top views each schematically illustrating an example configuration of an insulator illustrated in FIG. 1(A).

FIG. 1A is a side view schematically illustrating a configuration of an electrode assembly 100 in accordance with Embodiment 1 of the present invention. FIG. 1B is a top view schematically illustrating an example configuration of an insulator 3 illustrated in FIG. 1A. FIG. 1C is a top view schematically illustrating an example configuration of an insulator 4 illustrated in FIG. 1A.

The electrode assembly 100 includes an electrode group 1, an adhesive tape (which is a component provided on or near the electrode group) 2, the insulators (each of which is a component provided on or near the electrode group) 3 and 4, a positive electrode tab 5, a negative electrode tab 6, and insulating tapes (each of which is a component provided on or near the electrode group) 7 and 8.

The electrode group 1 is a well-known electrode group that includes (i) a positive electrode member which serves as a positive electrode, (ii) a negative electrode member which serves as a negative electrode, and (iii) a separator which is provided between the positive electrode member and the negative electrode member. Specifically, the electrode group 1 is a roll that is obtained by rolling a stack of the positive electrode member, the negative electrode member, and the separator into a roll.

The adhesive tape 2 serves to secure the tail end of the roll of the electrode group 1. The adhesive tape 2 is attached to a surface of the electrode group 1 so as to cross the tail end of the roll.

The insulator 3 serves to prevent a short circuit that may occur between the electrode group 1 and the positive electrode tab 5, which extends from the positive electrode member of the electrode group 1. The insulator 4 serves to prevent a short circuit that may occur between the electrode group 1 and the negative electrode tab 6, which extends from the negative electrode member of the electrode group 1. The positive electrode tab 5 extends from one of the opposite ends of the electrode group 1 in a width direction, and the negative electrode tab 6 extends from the other end of the electrode group 1. The insulator 3 and the insulator 4 are each made of, for example, polyethylene resin, polypropylene resin, phenol resin, or polyimide resin.

The insulator 3 has, for example, a ring shape when viewed from above (see FIG. 1B). The insulator 3 has a circular opening 31 for passage of the positive electrode tab 5.

The insulator 4 has, for example, when viewed from above, a ring shape with a circular opening 41 and four openings 42 through 45 (see FIG. 1C). The openings 42 through 45 each have a rectangular shape and facilitate passage of an electrolyte solution. The opening 41 is for passage of the negative electrode tab 6.

Note that the configurations of the insulator 3 in FIG. 1B and the insulator 4 in FIG. 1C are illustrative only. That is, there are no particular limitations on the shapes of the insulator 3 and the insulator 4, the number and shape of the opening(s) in the insulator 3, and the number and shape of the opening(s) in the insulator 4.

The insulating tape 7 serves to prevent a short circuit that may occur in case of contact between the positive electrode tab 5 and the negative electrode member of the electrode group 1. The insulating tape 7 is attached to the positive electrode tab 5, which extends from one of the opposite ends of the electrode group 1 in the width direction, so as to cover the positive electrode tab 5 except for the tip portion of the positive electrode tab 5. The insulating tape 8 serves to prevent a short circuit that may occur in case of contact between the negative electrode tab 6 and the positive electrode member of the electrode group 1. The insulating tape 8 is attached to the negative electrode tab 6, which extends from the other end of the electrode group 1, so as to cover the negative electrode tab 6 except for the tip portion of the negative electrode tab 6.

The electrode assembly 100 can be regarded as including: the electrode group 1; and components each provided on or near the electrode group 1, i.e., the adhesive tape 2, the insulator 3, the insulator 4, the insulating tape 7, and the insulating tape 8.

The adhesive tape 2, the insulator 3, the insulator 4, the insulating tape 7, and the insulating tape 8 each have a color value in the Munsell color system of not less than 3.0 and not more than 9.2 and a chroma in the Munsell color system of not less than 0.5.

The adhesive tape 2, the insulator 3, the insulator 4, the insulating tape 7, and the insulating tape 8 each have such a color that makes a black electrically-conductive substance and a white substance adhering to any of those members sufficiently visible, and therefore any foreign matter 9 adhering to the adhesive tape 2, the insulator 3, the insulator 4, the insulating tape 7, and/or the insulating tape 8 is easily found. This makes it possible to find and remove any foreign matter 9 adhering to the adhesive tape 2, the insulator 3, the insulator 4, the insulating tape 7, and/or the insulating tape 8 before placing the electrode assembly 100 in a battery can 101 (described later). This in turn allows for an improvement in sealing performance of the battery can 101, prevents an electrolyte solution from leaking out of a nonaqueous electrolyte secondary battery 400 (described later), and therefore allows for an improvement in quality of the nonaqueous electrolyte secondary battery 400. In addition, because the foreign matter 9 is prevented from entering the nonaqueous electrolyte secondary battery 400, the nonaqueous electrolyte secondary battery 400 is further improved in quality.

Preferably, the adhesive tape 2, the insulator 3, the insulator 4, the insulating tape 7, and the insulating tape 8 each have a color value in the Munsell color system of not less than 4.0 and not more than 9.0.

Preferably, the adhesive tape 2, the insulator 3, the insulator 4, the insulating tape 7, and the insulating tape 8 each have a gloss of not less than 10.

It is not preferable if a gloss (gloss unit; GU) measured by a measurement method standardized in ISO2813 is less than 10, because, for example, the black electrically-conductive substance is likely to be difficult to find due to lack of surface gloss or the foreign matter 9 easily adheres. Therefore, it is preferable that the adhesive tape 2, the insulator 3, the insulator 4, the insulating tape 7, and the insulating tape 8 each have a gloss of not less than 10.

The gloss of the adhesive tape 2, the insulator 3, the insulator 4, the insulating tape 7, or the insulating tape 8 can be adjusted by, for example, roughening or smoothing (e.g., by polishing) a surface of the adhesive tape 2, the insulator 3, the insulator 4, the insulating tape 7, or the insulating tape 8. For example, in a case where the insulator 3 and/or the insulator 4 are/is manufactured with use of a mold, the mold may be designed so as to achieve a desired gloss of the insulator 3 and/or the insulator 4. Meanwhile, the gloss of a surface of a base material of the adhesive tape 2, the insulating tape 7, or the insulating tape 8 can be adjusted by bringing a surface-fabricated roll into contact with the surface of the base material when the base material is manufactured.

Figure 2A:
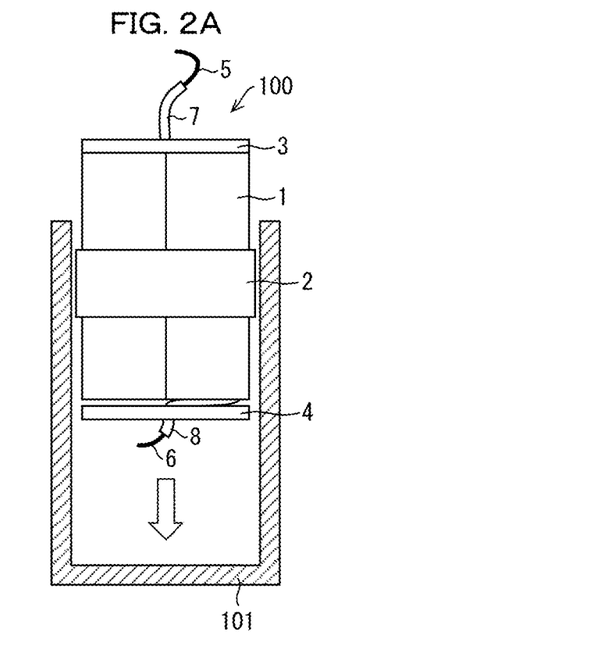
FIG. 2A through FIG. 2C are side views illustrating a method of producing a nonaqueous electrolyte secondary battery in accordance with Embodiment 1 of the present invention.
Figure 2B:
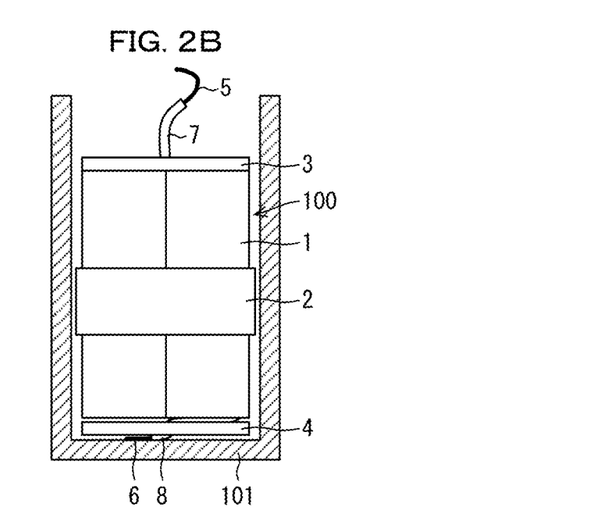
Figure 2C:
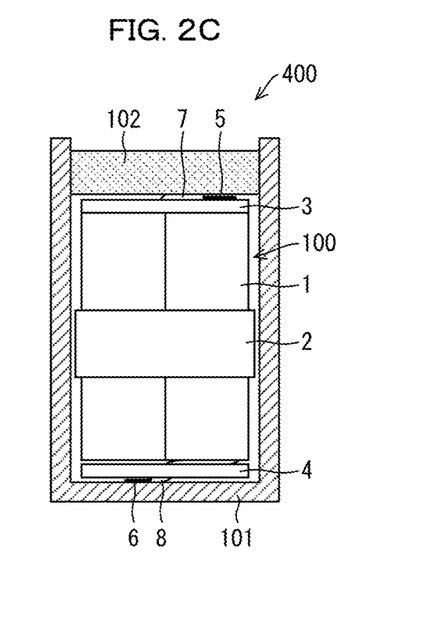

FIG. 2A through FIG. 2C are side views illustrating a method of producing the nonaqueous electrolyte secondary battery 400 in accordance with Embodiment 1 of the present invention. The battery can 101 in each of FIG. 2A through FIG. 2C is cross-sectioned for illustrative purposes.

First, the electrode assembly 100 is placed in the battery can (housing) 101, which is a metal conductor (see FIG. 2A). Note that the adhesive tape 2, the insulator 3, the insulator 4, the insulating tape 7, and the insulating tape 8 are checked for any foreign matter 9 and, if it is found, the foreign matter 9 is removed, prior to the step illustrated in FIG. 2A.

Next, the negative electrode tab 6 and the battery can 101 are electrically connected to each other by, for example, welding the negative electrode tab 6 to the bottom of the battery can 101 FIG. 2B.

Next, the positive electrode tab 5 and a closure 102 having an electrical conductivity are electrically connected to each other by, for example, welding the positive electrode tab 5 to the closure 102, and the battery can 101, which stores the electrode assembly 100 therein, is sealed with the closure 102 (FIG. 2C). Since the foreign matter 9 has been removed from the adhesive tape 2, the insulator 3, the insulator 4, the insulating tape 7, and the insulating tape 8 as described above, the inner wall of the battery can 101 is less prone to adhesion of the foreign matter 9. This prevents the foreign matter 9 from being trapped between the battery can 101 and the closure 102, thereby making it possible to improve the sealing performance of the battery can 101.

Note that, although not illustrated in each of FIG. 2A through FIG. 2C for clear illustration of the electrode assembly 100, an electrolyte solution composed mainly of an organic solvent is introduced into the battery can 101. The electrolyte solution can be introduced by any well-known technique such as (i) a method by which the electrolyte solution is introduced before the battery can 101 is sealed with the closure 102 or (ii) a method by which an opening(s) is/are formed in the closure 102 and, after the battery can 101 is sealed with the closure 102, the electrolyte solution is introduced through the opening(s). As such, detailed descriptions of the introduction of the electrolyte solution are omitted here.

In this manner, it is possible to realize a high-quality nonaqueous electrolyte secondary battery 400 that is less prone to leakage of an electrolyte solution. In addition, because the foreign matter 9 is prevented from entering the nonaqueous electrolyte secondary battery 400, the nonaqueous electrolyte secondary battery 400 is further improved in quality.

Embodiment 2

Figure 3A:
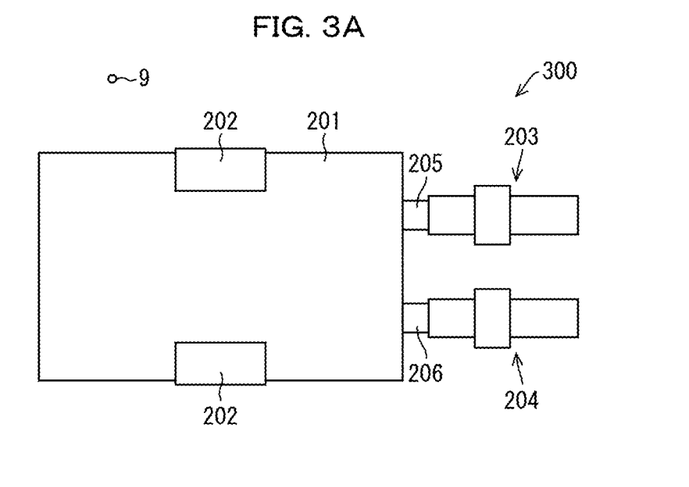
FIG. 3A is a top view schematically illustrating a configuration of an electrode assembly in accordance with Embodiment 2 of the present invention.
Figure 3B:
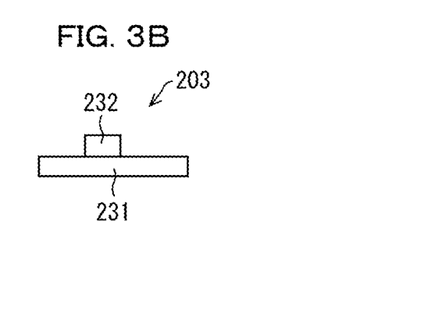
FIG. 3B and FIG. 3C are side views schematically each illustrating an example configuration of a tab extension illustrated in FIG. 3A.
Figure 3C:
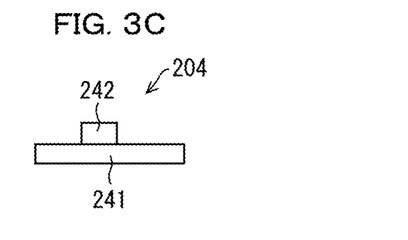
Figure 3D:
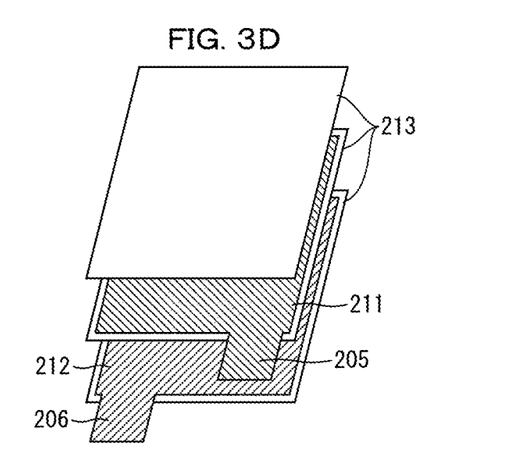
FIG. 3D is an exploded perspective view illustrating an electrode group illustrated in FIG. 3A.

FIG. 3A is a top view schematically illustrating a configuration of an electrode assembly 300 in accordance with Embodiment 2 of the present invention. FIG. 3B is a side view schematically illustrating an example configuration of a tab extension 203 illustrated in FIG. 3A. FIG. 3C is a side view schematically illustrating an example configuration of a tab extension 204 illustrated in FIG. 3A. FIG. 3D is an exploded perspective view illustrating an electrode group 201 illustrated in FIG. 3A.

The electrode assembly 300 includes the electrode group 201, adhesive tapes 202, the tab extensions 203 and 204, a positive electrode tab 205, and a negative electrode tab 206.

As illustrated in FIG. 3D, the electrode group 201 is a well-known electrode group that includes (i) a positive electrode member 211 which serves as a positive electrode, (ii) a negative electrode member 212 which serves as a negative electrode, and (iii) a separator 213 which is provided between the positive electrode member 211 and the negative electrode member 212. The electrode group 201 further includes two separators 213 which are respectively provided on the outer surfaces of the positive electrode member 211 and the negative electrode member 212. Specifically, the electrode group 201 is a stack obtained by stacking repeatedly the positive electrode member 211, the separator 213 and the negative electrode member 212.

The adhesive tapes 202 are attached to respective opposite ends of the electrode group 201 in a width direction and serve to fasten (relatively fix) the positive electrode member 211, the negative electrode member 212, and the separators 213 together.

As illustrated in FIG. 3D, the tab extension 203 includes, for example, a lead part 231 and an insulator (which is a component provided on or near the electrode group) 232. The lead part 231 is electrically connected (by, for example, welding) to the positive electrode tab 205, which extends from the positive electrode member 211, and serves as a lead wire. The insulator 232 is provided on the lead part 231 so as to extend across the lead part 231.

As illustrated in FIG. 3C, the tab extension 204 includes, for example, a lead part 241 and an insulator (which is a component provided on or near the electrode group) 242. The lead part 241 is electrically connected (by, for example, welding) to the negative electrode tab 206, which extends from the negative electrode member 212, and serves as a lead wire. The insulator 242 is provided on the lead part 241 so as to extend across the lead part 241.

The insulator 232 serves to prevent a short circuit that may occur between the electrode group 201 and the positive electrode tab 205. The insulator 242 serves to prevent a short circuit that may occur between the electrode group 201 and the negative electrode tab 206. Both the positive electrode tab 205 and the negative electrode tab 206 extend from one of the opposite ends of the electrode group 201 in a longitudinal direction. In addition, the insulator 232 and the insulator 242 contribute to an improvement in adhesion between a container portion 301 and a lid portion 302 of a housing (described later). Specifically, the insulator 232 and the insulator 242 are designed to be highly adhesive to the lead part 231 and the lead part 241, respectively. The insulator 232 and the insulator 242 are each designed to be also highly adhesive to the housing. Because the insulator 232 and the insulator 242 each exhibit high fluidity at a temperature at which thermal lamination is carried out, the insulator 232 and the insulator 242 can fill gaps that are formed due to the thicknesses of the lead part 231 and the lead part 241 when the housing is sealed.

The insulator 232 and the insulator 242 are each made of, for example, an acid-modified polyolefin resin.

Note that the configurations of the insulator 232 in FIG. 3B and the insulator 242 in FIG. 3C are illustrative only. That is, the shapes of the insulator 232 and the insulator 242 are not limited to a particular shape.

The electrode assembly 300 can be regarded as including: the electrode group 201; and components each provided on or near the electrode group 201, i.e., the adhesive tapes 202, the insulator 232, and the insulator 242.

The adhesive tapes 202, the insulator 232, and the insulator 242 each have a color value in the Munsell color system of not less than 3.0 and not more than 9.2 and a chroma in the Munsell color system of not less than 0.5. Preferably, the adhesive tapes 202, the insulator 232, and the insulator 242 each have a color value in the Munsell color system of not less than 4.0 and not more than 9.0. Moreover, it is preferable that the adhesive tapes 202, the insulator 232, and the insulator 242 each have a gloss of not less than 10. A mechanism of an effect brought about by each of the above configurations is similar to that of the effect brought about by a corresponding one of the earlier-described configurations of the adhesive tape 2, the insulator 3, and the insulator 4, and therefore a detailed description for such a mechanism is omitted here.

Figure 4A:
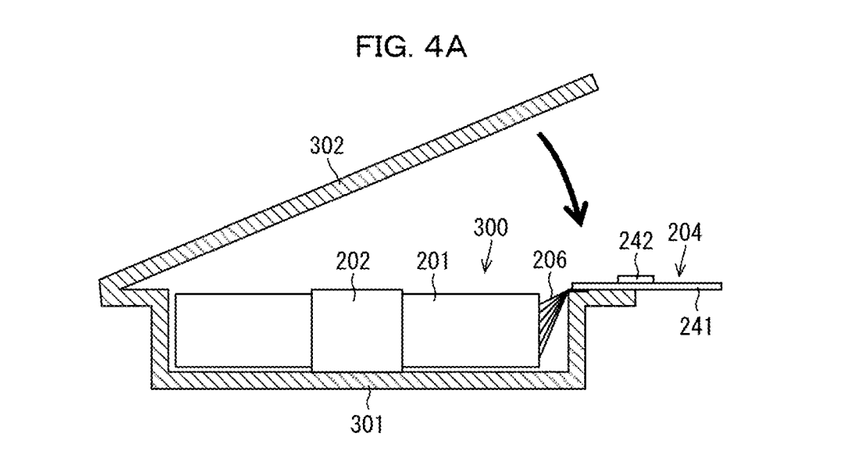
FIG. 4A and FIG. 4B are side views illustrating a method of producing a nonaqueous electrolyte secondary battery in accordance with Embodiment 2 of the present invention.
Figure 4B:
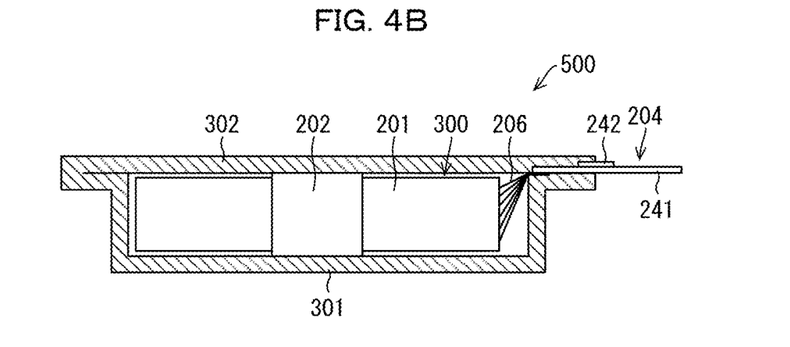

FIG. 4A and FIG. 4B are side views illustrating a method of producing a nonaqueous electrolyte secondary battery 500 in accordance with Embodiment 2 of the present invention. The container portion 301 of the housing in each of FIG. 4A and FIG. 4B is cross-sectioned for illustrative purposes.

First, the electrode assembly 300 is placed in the container portion 301, and the lid portion 302 is closed (see FIG. 4A). The container portion 301 and the lid portion 302 are each made of, for example, a laminate film whose surfaces are coated with resin. Note that the adhesive tapes 202, the insulator 232, and the insulator 242 are checked for any foreign matter 9 and, if it is found, the foreign matter 9 is removed, prior to the step illustrated in FIG. 4A.

Next, the container portion 301, which stores the electrode assembly 300 therein, is sealed by thermally laminating the container portion 301 and the lid portion 302. In so doing, the insulator 232 and the insulator 242 are sandwiched between the container portion 301 and the lid portion 302 (see FIG. 4B). Because the foreign matter 9 has been removed from the adhesive tapes 202, the insulator 232, and the insulator 242 as described above, the inner wall of the container portion 301 is less prone to adhesion of the foreign matter 9. This prevents the foreign matter 9 from being trapped between the container portion 301 and the lid portion 302 and thereby makes it possible to improve the sealing performance of the container portion 301.

Note that, although not illustrated in each of FIG. 4A and FIG. 4B for clear illustration of the electrode assembly 300, an electrolyte solution composed mainly of an organic solvent is introduced into the container portion 301. The electrolyte solution can be introduced by any well-known technique such as (i) a method by which the electrolyte solution is introduced before the container portion 301 is sealed with the lid portion 302 or (ii) a method by which an opening(s) is/are formed in the lid portion 302 and, after the container portion 301 is sealed with the lid portion 302, the electrolyte solution is introduced through the opening(s). As such, detailed descriptions of the introduction of the electrolyte solution are omitted here.

In regard to the nonaqueous electrolyte secondary battery 500, it can be said that the housing having the container portion 301 and the lid portion 302 also serves as a closure.

Figure 5A:
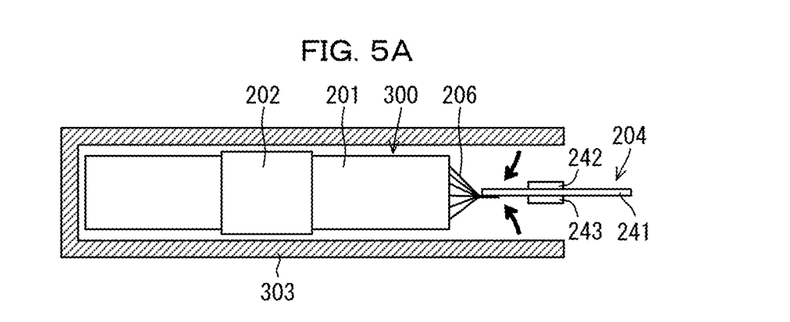
FIG. 5A and FIG. 5B are side views illustrating a method of producing another nonaqueous electrolyte secondary battery in accordance with Embodiment 2 of the present invention.
Figure 5B:
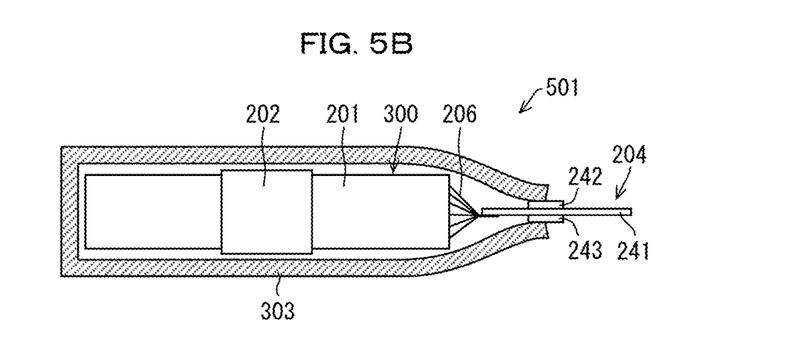

FIG. 5A and FIG. 5B are side views illustrating a method of producing another nonaqueous electrolyte secondary battery 501 in accordance with Embodiment 2 of the present invention. A housing 303 in each of FIG. 5A and FIG. 5B is cross-sectioned for illustrative purposes. The following description will only discuss differences between the method of producing the nonaqueous electrolyte secondary battery 501 and the above-described method of producing the nonaqueous electrolyte secondary battery 500.

In the nonaqueous electrolyte secondary battery 501, the tab extension 204 further has an insulator 243 which has the same function as the insulator 242. The insulator 243 and the insulator 242 are opposite each other with the lead part 241 between them. Similarly, although not illustrated in each of FIG. 5A and FIG. 5B for simple illustration, the tab extension 203 of the nonaqueous electrolyte secondary battery 501 further has an insulator (herein referred to as an insulator 233) which has the same function as the insulator 232. The insulator 233 and the insulator 232 are opposite each other with the lead part 231 between them.

The nonaqueous electrolyte secondary battery 501 employs a pouch-type housing 303 instead of the housing having the container portion 301 and the lid portion 302. The housing 303 is made of a material similar to the material for the housing having the container portion 301 and the lid portion 302.

First, the electrode assembly 300 is placed in the housing 303, and the housing 303 is closed (see FIG. 5A). Note that the adhesive tapes 202, the insulator 232, the insulator 242, the insulator 233, and the insulator 243 are checked for any foreign matter 9, and if it is found, the foreign matter 9 is removed, prior to the step illustrated in FIG. 5A.

Next, the housing 303, which stores the electrode assembly 300 therein, is sealed by thermally laminating the housing 303. In so doing, the insulator 232, the insulator 242, the insulator 233, and the insulator 243 are sandwiched between sealed portions of the housing 303 (see FIG. 5B). Because the foreign matter 9 has been removed from the adhesive tapes 202, the insulator 232, the insulator 242, the insulator 233, and the insulator 243 as described above, the inner wall of the housing 303 is less prone to adhesion of the foreign matter 9. This prevents the foreign matter 9 from being trapped between the sealing portions and thereby makes it possible to improve the sealing performance of the housing 303.

Note that, although not illustrated in each of FIG. 5A and FIG. 5B for clear illustration of the electrode assembly 300, an electrolyte solution composed mainly of an organic solvent is introduced into the housing 303. The electrolyte solution can be introduced by any well-known technique such as (i) a method by which the electrolyte solution is introduced before the housing 303 is sealed or (ii) a method by which an opening(s) is/are formed in the housing 303 and, after the housing 303 is sealed, the electrolyte solution is introduced through the opening(s). As such, detailed descriptions of the introduction of the electrolyte solution are omitted here.

In regard to the nonaqueous electrolyte secondary battery 501, it can be said that the housing 303 also serves as a closure.

In this manner, it is possible to realize a high-quality nonaqueous electrolyte secondary battery 500 that is less prone to leakage of an electrolyte solution. In addition, because the foreign matter 9 is prevented from entering the nonaqueous electrolyte secondary battery 500, the nonaqueous electrolyte secondary battery 500 is further improved in quality. The same applies to the nonaqueous electrolyte secondary battery 501.

An electrode assembly in accordance with a first aspect of the present invention is an electrode assembly configured to be housed in a housing, the electrode assembly including: an electrode group including a positive electrode member, a negative electrode member, and a separator provided between the positive electrode member and the negative electrode member; and a component provided on or near the electrode group, the component having a color value in the Munsell color system of not less than 3.0 and not more than 9.2 and a chroma in the Munsell color system of not less than 0.5.

According to the above configuration, the component provided on or near the electrode group of the electrode assembly in accordance with an embodiment of the present invention has such a color that makes a black electrically-conductive substance and/or a white substance adhering to the component sufficiently visible, and therefore foreign matter adhering to the component is easily found. This makes it possible to find and remove foreign matter adhering to the component before placing the electrode assembly in the housing. This in turn allows for an improvement in sealing performance of the housing, prevents an electrolyte solution from leaking out of a nonaqueous electrolyte secondary battery, and therefore allows for an improvement in quality of the nonaqueous electrolyte secondary battery. In addition, because the foreign matter is prevented from entering the nonaqueous electrolyte secondary battery, the nonaqueous electrolyte secondary battery is further improved in quality.

The electrode assembly in accordance with a second aspect of the present invention is preferably configured such that the color value of the component in the Munsell color system is not less than 4.0 and not more than 9.0.

The electrode assembly in accordance with a third aspect of the present invention is preferably configured such that the component has a gloss of not less than 10.

It is not preferable if a gloss (gloss unit; GU) measured by a measurement method standardized in ISO2813 is less than 10, because, for example, the black electrically-conductive substance is likely to be difficult to find due to lack of surface gloss or the foreign matter easily adheres. Therefore, it is preferable that the component has a gloss of not less than 10.

The gloss of the component can be adjusted by, for example, roughening or smoothing (e.g., by polishing) a surface of the component. For example, in a case where the component is manufactured with use of a mold, the mold may be designed so as to achieve a desired gloss of the component. In a case where the component is an adhesive tape, the gloss of a surface of a base material of the adhesive tape can be adjusted by bringing a surface-fabricated roll into contact with the surface of the base material when the base material is manufactured.

A nonaqueous electrolyte secondary battery in accordance with a fourth aspect of the present invention includes the electrode assembly and a housing.

According to the above configuration, it is possible to realize a high-quality nonaqueous electrolyte secondary battery that is less prone to leakage of an electrolyte solution. In addition, because the foreign matter is prevented from entering the nonaqueous electrolyte secondary battery, the nonaqueous electrolyte secondary battery is further improved in quality.

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

Experiments were conducted to study an effect brought about by a component provided on or near an electrode group in accordance with an embodiment of the present invention. Details of the experiments will be discussed below. Hereinafter, the component provided on or near the electrode group will be referred to as a "colored component".

First, a first contaminant sample and a second contaminant sample were prepared, each of which simulated a contaminant (foreign matter) that would adhere to the colored component.

The first contaminant sample was prepared as follows. Specifically, 0.25 g of acetylene black (product name: DENKA BLACK HS100, manufactured by Denka Company Limited), 1.15 g of polyvinylidene fluoride resin (PVDF) #1120 (manufactured by KUREHA CORPORATION, dissolved in NMP (N-methyl-2-pyrolidone), solid content: 12% by weight), and 1.00 g of NMP were mixed with stirring until uniformity was achieved, thereby obtaining a first paint having a solid content of 16%. The first paint thus obtained was coated on a glass plate of 1 mm in thickness with use of a coater bar with a clearance of 50 µm, and was then dried at 80° C. The first contaminant sample was thus prepared. The weight per unit area of the contaminant was 6.3 g/m$^2$. The weight per unit area was calculated based on the difference between the weight of the uncoated glass plate and the weight of the coated, dried glass plate.

The second contaminant sample was prepared as follows. Specifically, 0.25 g of acetylene black (product name: DENKA BLACK HS100, manufactured by Denka Company Limited), 1.02 g of PVDF #1120 (manufactured by KUREHA CORPORATION, dissolved in NMP, solid content: 12% by weight), and 7.49 g of NMP were mixed with stirring until uniformity was achieved, thereby obtaining a second paint having a solid content of 4%. The second paint thus obtained was coated on a glass plate of 1 mm in thickness with use of a coater bar with a clearance of 50 µm, and was then dried at 80° C. The second contaminant sample was thus prepared. The weight per unit area of the contaminant was 3.5 g/m$^2$. The weight per unit area was calculated based on the difference between the weight of the uncoated glass plate and the weight of the coated, dried glass plate.

With respect to each of colors of Examples 1 through 14 and Comparative Examples 1 through 7, visibility of each contaminant sample was checked in the following manner. Specifically, the first contaminant sample and the second contaminant sample were placed on a corresponding color of Standard Paint Colors 2015 H-Edition (pocket type, Japan Paint Manufacturers Association) and visually checked under an environment with an illuminance of not less than 300 luxes with use of an Hf fluorescent lamp (FHF32EX-N-K, manufactured by Hitachi Appliances, Inc.), and then visibility was judged on the basis of the following criteria. Note that the gloss of each color in Standard Paint Colors 2015 H-Edition (pocket type, Japan Paint Manufacturers Association) was measured with an incident angle of 60° with use of a handy glossmeter PG-IIM (manufactured by NIPPON DENSHOKU INDUSTRIES Co., LTD., relevant standard: ISO2813, measurement range: 0-1000 GU, resolution: 0.1 GU). The measured value of the gloss was rounded off to the nearest integer.

Good visibility (contaminant is clearly visible): Good

Average visibility (contaminant is visible when it is carefully viewed): Average Poor Visibility (contaminant is difficult to see): Poor On the other hand, α alumina (product name: AKP-3000, manufactured by Sumitomo Chemical Company, Limited) was used as white foreign matter. With respect to each of the colors of Examples 10 through 14, 5 mg of the white foreign matter was placed on a corresponding color of Standard Paint Colors 2015 H-Edition (pocket type, Japan Paint Manufacturers Association) and visually checked under an environment with an illuminance of not less than 300 luxes with use of the Hf fluorescent lamp (FHF32EX-N-K, manufactured by Hitachi Appliances, Inc.), and then visibility was judged on the basis of the following criteria.

Good visibility (white foreign matter is clearly visible): Good

Average visibility (white foreign matter is visible when it is carefully viewed): Average Table 1 shows the results obtained by checking the visibility. In Table 1, "First Contaminant Sample (High Weight per Unit Area)", "Second Contaminant Sample (Low Weight per Unit Area)", and "White Foreign Matter" show the results obtained by checking the visibility of the first contaminant sample, the second contaminant sample, and the white foreign matter, respectively.

TABLE 1

| | | | | | Visibility | | |
| --- | --- | --- | --- | --- | --- | --- | --- |
| | Hue | Value | Chroma | Gloss | First Contaminant Sample (High Weight per Unit Area) | Second Contaminant Sample (Low Weight per Unit Area) | White Foreign Matter |
| Ex. 1 | 5R | 3.0 | 1.0 | 46 | Average | Poor | |
| Ex. 2 | 5G | 3.0 | 6.0 | 81 | Average | Poor | |
| Ex. 3 | 5R | 3.0 | 2.0 | 46 | Average | Poor | |
| Ex. 4 | 5R | 4.0 | 12.0 | 77 | Good | Good | |
| Ex. 5 | 5G | 5.0 | 4.0 | 51 | Good | Good | |
| Ex. 6 | 10B | 5.0 | 10.0 | 80 | Good | Good | |
| Ex. 7 | 5YR | 6.5 | 0.5 | 73 | Good | Good | |
| Ex. 8 | 5G | 7.0 | 0.5 | 79 | Good | Good | |
| Ex. 9 | 5RP | 7.0 | 6.0 | 83 | Good | Good | |
| Ex. 10 | 5Y | 9.0 | 2.0 | 73 | Good | Good | Good |
| Ex. 11 | 5R | 9.2 | 1.0 | 77 | Good | Good | Average |
| Ex. 12 | 10YR | 9.2 | 1.0 | 79 | Good | Good | Average |
| Ex. 13 | 5GY | 9.2 | 1.0 | 77 | Good | Good | Average |
| Ex. 14 | 5Y | 8.0 | 13.0 | 84 | Good | Good | Good |
| Com. Ex. 1 | N | 1.0 | 0.0 | 68 | Poor | Poor | |
| Com. Ex. 2 | N | 1.5 | 0.0 | 79 | Poor | Poor | |
| Com. Ex. 3 | N | 2.0 | 0.0 | 79 | Poor | Poor | |
| Com. Ex. 4 | 5R | 2.0 | 1.0 | 59 | Poor | Poor | |
| Com. Ex. 5 | 5G | 2.0 | 2.0 | 79 | Poor | Poor | |
| Com. Ex. 6 | 7.5PB | 2.0 | 6.0 | 78 | Poor | Poor | |
| Com. Ex. 7 | N | 3.0 | 0.0 | 78 | Poor | Poor | |

Note:
"Ex" stands for Example and
"Com. Ex." stands for Comparative Example.

Next, the results of Examples 15 and 16 and Comparative Example 8, each of which is the same as Example 14 except for gloss, are shown in Table 2. The visibility of the first contaminant sample was checked on the basis of the earlier-described criteria, and the obtained result is shown in the "First Contaminant Sample (High Weight per Unit Area)" column of Table 2. The visibility of the second contaminant sample was checked on the basis of the earlier-described criteria, and the obtained result is shown in the "Second Contaminant Sample (Low Weight per Unit Area)" column of Table 2. The visibility of the white foreign matter was checked on the basis of the earlier-described criteria, and the obtained result is shown in the "White Foreign Matter" column of Table 2. Note that the gloss was measured under the same conditions as those described earlier.

TABLE 2

| | Hue | Value | Chroma | Gloss | Visibility | | White Foreign Matter |
|---|---|---|---|---|---|---|---|
| | | | | | First Contaminant Sample (High Weight per Unit Area) | Second Contaminant Sample (Low Weight per Unit Area) | |
| Ex. 14 | 5Y | 8.0 | 13.0 | 84 | Good | Good | Good |
| Ex. 15 | 5Y | 8.0 | 13.0 | 49 | Good | Good | Good |
| Ex. 16 | 5Y | 8.0 | 13.0 | 15 | Good | Average | Good |
| Com. Ex. 8 | 5Y | 8.0 | 13.0 | 7 | Average | Poor | |

Note:
"Ex" stands for Example and
"Com. Ex." stands for Comparative Example.

The above experimental results demonstrate that: a beneficial effect is brought about in a case where the colored component has a color value in the Munsell color system of not less than 3.0 and not more than 9.2 and a chroma in the Munsell color system of not less than 0.5; and a particularly beneficial effect is brought about in a case where the value is not less than 4.0 and not more than 9.0. The results also demonstrate that a more beneficial effect is brought about in a case where the colored component has a gloss of not less than 10 and where the color of the colored component meets the above lightness and chroma.

REFERENCE SIGNS LIST

1: Electrode group
2: Adhesive tape (component provided on or near the electrode group)
3: Insulator (component provided on or near the electrode group)
4: Insulator (component provided on or near the electrode group)
7: Insulating tape (component provided on or near the electrode group)
8: Insulating tape (component provided on or near the electrode group)
9: Foreign matter
100: Electrode assembly
101: Battery can (housing)
102: Closure
201: Electrode group
202: Adhesive tape (component provided on or near the electrode group)
211: Positive electrode member
212: Negative electrode member
213: Separator
232: Insulator (component provided on or near the electrode group)
233: Insulator (component provided on or near the electrode group)
242: Insulator (component provided on or near the electrode group)
243: Insulator (component provided on or near the electrode group)
300: Electrode assembly
301: Container portion of housing
302: Lid portion of housing
303: Housing
400: Nonaqueous electrolyte secondary battery
500: Nonaqueous electrolyte secondary battery
501: Nonaqueous electrolyte secondary battery

The invention claimed is:

1. An electrode assembly configured to be housed in a housing,
the electrode assembly comprising:
an electrode group including a positive electrode member, a negative electrode member, and a separator provided between the positive electrode member and the negative electrode member; and
a component provided on the electrode group,
the component having a color value in the Munsell color system of not less than 4.0 and not more than 9.0 and a chroma in the Munsell color system of not less than 0.5.

2. The electrode assembly as set forth in claim 1, wherein the component has a gloss of not less than 10.

3. A nonaqueous electrolyte secondary battery, comprising:
the electrode assembly recited in claim 1; and
a housing.

4. An electrode assembly configured to be housed in a housing,
the electrode assembly comprising:
an electrode group including a positive electrode member, a negative electrode member, and a separator provided between the positive electrode member and the negative electrode member;
a positive electrode tab which extends from the positive electrode member; and
a component provided on the positive electrode or a lead part which is electrically connected to the positive electrode,
the component having a color value in the Munsell color system of not less than 4.0 and not more than 9.0 and a chroma in the Munsell color system of not less than 0.5.

5. An electrode assembly configured to be housed in a housing,
the electrode assembly comprising:
an electrode group including a positive electrode member, a negative electrode member, and a separator provided between the positive electrode member and the negative electrode member;
a negative electrode tab which extends from the negative electrode member; and a component provided on the negative electrode or a lead part which is electrically connected to the negative electrode, the component having a color value in the Munsell color system of not less than 4.0 and not more than 9.0 and a chroma in the Munsell color system of not less than 0.5.

\* \* \* \* \*